(12) United States Patent
Labuda

(10) Patent No.: US 8,289,137 B1
(45) Date of Patent: Oct. 16, 2012

(54) FAULT TOLERANT DISTRIBUTED EXECUTION OF RESIDENTIAL DEVICE CONTROL

(75) Inventor: David S. Labuda, Palo Alto, CA (US)

(73) Assignee: David S. Labuda, Palo Alto, CA (US)

( * ) Notice: Subject to any disclaimer, the term of this patent is extended or adjusted under 35 U.S.C. 154(b) by 716 days.

(21) Appl. No.: 11/503,535

(22) Filed: Aug. 10, 2006

(51) Int. Cl.
  *G08B 5/22* (2006.01)
  *G08B 25/00* (2006.01)
  *G05B 19/02* (2006.01)

(52) U.S. Cl. ....... 340/8.1; 340/3.54; 340/4.3; 340/13.24

(58) Field of Classification Search ............. 340/825.49, 340/3.54, 3.51, 3.1, 825.22, 825.72, 538; 700/83, 17; 370/462
See application file for complete search history.

(56) References Cited

U.S. PATENT DOCUMENTS

| | | | |
|---|---|---|---|
| 5,400,246 A * | 3/1995 | Wilson et al. .................. 700/17 |
| 5,646,608 A * | 7/1997 | Shintani ......................... 340/3.7 |
| 6,111,374 A * | 8/2000 | Fitzgibbon et al. ........... 318/282 |
| 6,124,804 A * | 9/2000 | Kitao et al. ................. 340/12.28 |
| 6,133,847 A * | 10/2000 | Yang ........................... 340/12.25 |
| 6,385,495 B1 | 5/2002 | Bennett |
| 6,480,586 B1 * | 11/2002 | Hayes et al. ............. 379/102.02 |
| 6,563,430 B1 * | 5/2003 | Kemink et al. .......... 340/825.49 |
| 6,574,234 B1 * | 6/2003 | Myer et al. ..................... 370/462 |
| 6,754,190 B2 * | 6/2004 | Gurney et al. ................. 370/329 |
| 6,774,813 B2 * | 8/2004 | van Ee et al. .............. 340/12.23 |
| 7,151,968 B2 * | 12/2006 | Williamson .................... 700/65 |
| 7,586,398 B2 * | 9/2009 | Huang et al. ................. 340/10.5 |

* cited by examiner

Primary Examiner — Nam V Nguyen
(74) Attorney, Agent, or Firm — Van Pelt, Yi & James LLP

(57) ABSTRACT

Distributed execution of residential device control is disclosed. A system state definition is received for a plurality of residential devices. A set of instructions for the plurality of residential devices is composed based at least in part on the system state definition. For each of the plurality of residential devices, the set of instructions is filtered to identify a subset of instructions for a residential device. At least a portion of the set of instructions is distributed to the residential device, so that the identified subset of instructions for the residential device can be executed by the residential device.

44 Claims, 6 Drawing Sheets

FAULT TOLERANT DISTRIBUTED EXECUTION OF RESIDENTIAL DEVICE CONTROL

BACKGROUND OF THE INVENTION

Residential devices, such as lights, are typically controlled directly using a switch or controller. In some cases, more advanced systems allow central control of residential devices—for example, all the lights in the house are controlled through a central control system. These advanced systems allow complex states (e.g., settings for all the lights in a house or a room) to be programmed in and later recalled. However, centrally controlled systems also offer a single point of failure and require wiring a house so that all the devices in a house pass through a controlled switch center. In addition, centrally controlled systems can require extensive custom wiring to connect the control system with the individual residential devices. It would be beneficial to have the complex states allowed by a central control system without the single point of failure. It would also be beneficial to be able to install a control system without extensive custom wiring.

BRIEF DESCRIPTION OF THE DRAWINGS

Various embodiments of the invention are disclosed in the following detailed description and the accompanying drawings.

DETAILED DESCRIPTION

Figure 1:
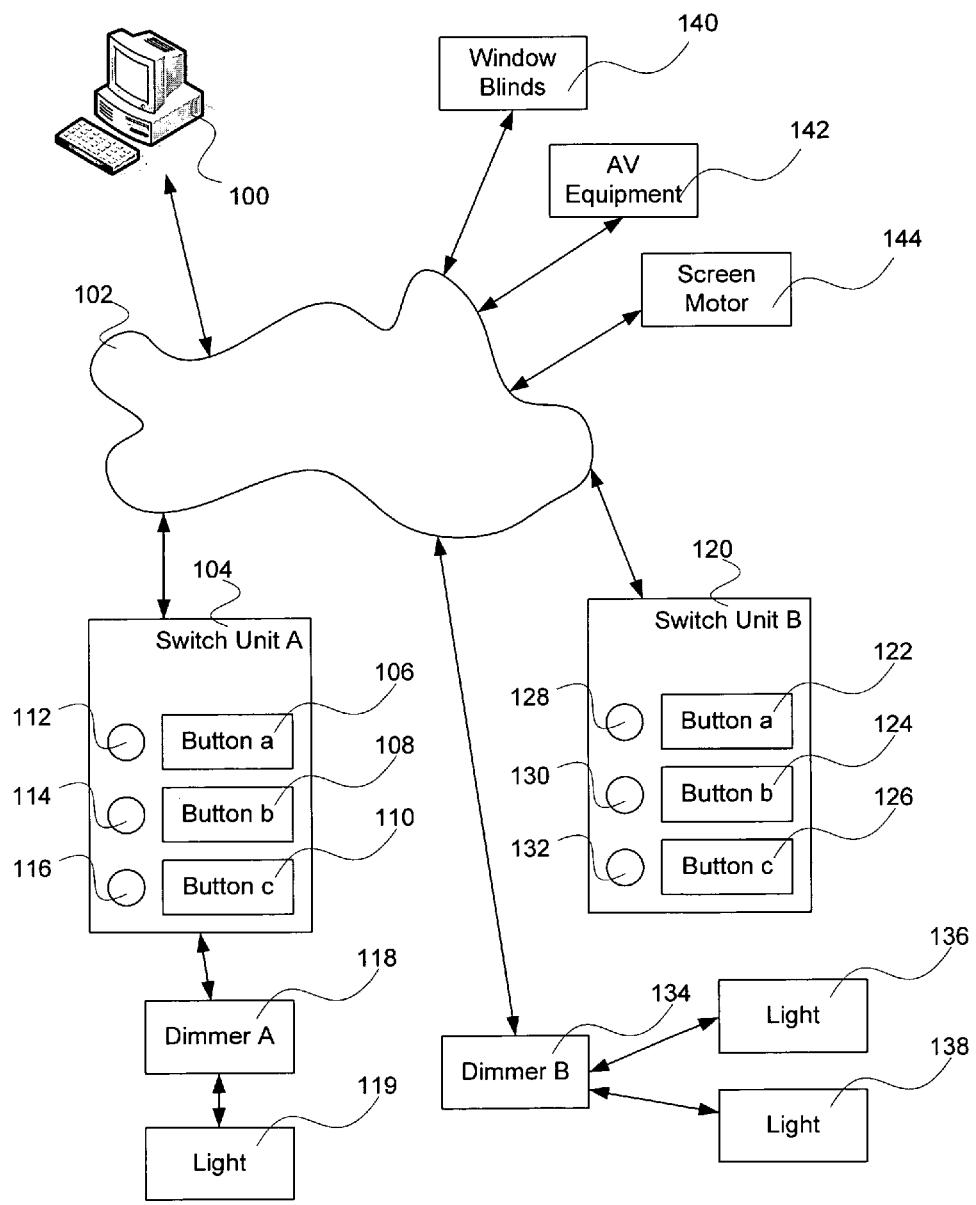
FIG. 1 is a block diagram illustrating an embodiment of a system for distributed execution of residential device control.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Fault tolerant distributed execution of residential device control is disclosed. A system state definition for a plurality of residential devices is received. A set of instructions for the plurality of residential devices based at least in part on the system state definition is composed. For each of the plurality of residential devices, the set of instructions is filtered to identify a subset of instructions for a residential device. At least a portion of the set of instructions is distributed to the residential device so that the identified subset of instructions for the residential device can be executed by the residential device.

In some embodiments, a computer system is used to define a number of states for devices in a home. These states can include lighting levels, audio visual equipment states, heating/air conditioning states, projection screen states, window blind states, and/or any other appropriate residential device states. Residential devices can include a computer, a lighting unit, a dimmer unit, a light control (e.g., a switch) unit, a window blind unit, a home theater screen unit, a home theater equipment unit, a stereo unit, a television unit, a projector unit, a speaker unit, a volume control unit, a heating unit, an air conditioning unit, a thermostat unit, a buddy device, a state indication unit, electrical measurement unit, an electrical receptacle unit, or any other appropriate device.

In some embodiments, the computer system can test these states by controlling the devices to see if the devices are controlled appropriately compared to the user's desire (e.g., lighting levels set appropriately for the state, screen in correct position for a movie, sound levels set appropriately for a television show or party, etc.). A system state definition includes specifying a number of device identifications, their corresponding device states and their state durations. The computer can compose the appropriate instructions for each device to follow for a given state. These instructions are distributed to the devices so that they can be executed, when appropriate, by the devices. Filtering the instructions to identify the subset of instructions for a particular device can be done before distributing instructions to the particular device (i.e., only instructions appropriate to the device are distributed to the device) or after distributing to the particular device (i.e., a set of instructions that includes, but is not exclusive to, the instructions for device are distributed to the device).

In some embodiments, fault tolerance is supported by distributing instructions for a first device to a second device so that the second device can reload the instructions of the first device (e.g., when the first device fails) and can monitor the first device to see if it is operating appropriately. In some embodiments, fault tolerance is also supported by having a manual mode for a device so that the device can be controlled so that the device state specified by the system state is overridden. In some embodiments, there is direct control of a switch in a "local" mode. In the local mode, even if the network fails and no system state or control instructions are available, then the residential device, such as a switch, is still physically connected to another residential device, such as a dimmer and light, such that they can act autonomously without any help from the rest of the system if necessary. In some embodiments, the system can still operate as a plurality of localized networks in the event that some or all of the communication channels between networked devices are severed or fail to function. For example, a number of devices in a room, even if not in communication with other devices in other rooms of the house, can still operate, when no devices nor messages/instructions from devices external to the room are required; Operation within the room can include sending and receiving messages and/or instructions to and/or from devices within the room.

In some embodiments, composing a set of instructions includes taking the received system states that are defined based on user input via a graphical user interface and generating a set of device instructions. The device instructions can include generating a set of computer code instructions, generating a set of assembly code instructions, generating a set of C language instructions, generating a set of JAVA instructions, generating a set of scripts, and/or any other appropriate way of generating instructions for devices.

In some embodiments, fault tolerance is further supported by having a second device monitor and/or record notifications transmitted to and from a device. In cases when the device is not responding as appropriate, the second monitoring device transmits a notification that the device is not responding appropriately or transmits instructions to the device that is not responding appropriately (e.g., an instruction to reset or reload an instruction set).

In some embodiments, the composed set of instructions is filtered to identify the subset of instructions required for a given device, and the device receives the appropriate subset when a distribution of instruction occurs. In some embodiments, the device receives all instructions or more than the subset required for the device, and the device internally filters to identify the appropriate subset of instructions to execute.

In some embodiments, the computer can simulate the system states received—for example, a simulated set of switches, lights, and other devices are controlled and displayed in the simulated environment of the computer. In some embodiments, the system states can be measured—for example, power consumption, room temperature, time the lights are on, or any other appropriate system state measurement. In some embodiments, a report is created based on the system state measurements.

FIG. 1 is a block diagram illustrating an embodiment of a system for distributed execution of residential device control. In the example shown, computer 100 is able to communicate with network 102. Network 102 can include a local area network, a wide area network, a wired network, a wireless network, a power line network, Wi-Fi™, Wi-Max™, the Internet, or any other appropriate communication network. Devices are also able to communicate with network 102 represented in FIG. 1 by window blinds 140, audio-visual (AV) equipment 142, screen motor 144, switch unit A 104, switch unit B 120, and dimmer B 134. In various embodiments, dimmers are included as part of a switch, as part of a light fixture, and/or as an independent unit controlling one or more lights. In some embodiments, a user inputs system state information into computer 100; computer 100 composes instructions for devices; filtering is performed to identify subsets of instructions for devices; and instructions are distributed such that the appropriate subset of instructions can be executed by a device. In some embodiments, computer 100 monitors instructions transmitted for one or more devices for fault tolerance purposes and can indicate a lack of response to a scene change, reset a device, reload instructions, measure device performance or resource usage, etc. In some embodiments, the network does not require extensive custom wiring (e.g., all devices do not require separate network connection).

In some embodiment, the devices do not require extensive custom wiring (e.g., all switch or power lines do not need to go to a central controller).

In the example shown in FIG. 1, switch unit A 104 includes a number of buttons—represented by button a 106, button b 108, and button c 110—and a number of status lights—represented by 112, 114, and 116. Switch unit A 104 is able to communicate with dimmer A 118 which in turn is able to communicate and/or control light 119. Switch unit B 120 includes a number of buttons—represented by button a 122, button b 124, and button c 126—and a number of status lights—represented by 128, 130, and 132. Switch unit B 120 is able to communicate with dimmer B 134 which in turn is able to communicate and/or control lights 136 and 138. In some embodiments, lights such as lights 119, 136, and 138 are in direct communication with network 102.

In some embodiments, a button on a switch unit—for example, button a 106 on switch unit A 104—can be pushed to activate a state (e.g., reading state, television watching state, etc.) of the lights in a room, and status light 112 of switch unit A 104 indicates that the state is active. In some cases, status light 128 and button a 122 on switch unit B 120 also correspond to the same state of the lights in the room as button a 106 and status light 112. In this case, when the state is activated or deactivated by pushing either button a 106 or button a 122, then status lights 112 and 128 both indicate if the state is active.

In some embodiments, a residential device includes a manual mode that can control the residential device overriding a current system state. For example, a light switch controlling a lighting unit is set in a scene to be 'OFF.' The switch can be manipulated to override the 'OFF' setting and turn the light 'ON'. In some cases, the switch is in a just shipped state and the switch is not responding to a control state, however, the switch is still able to be directly manipulated such that the light can be turned to the 'ON' state.

Figure 2:
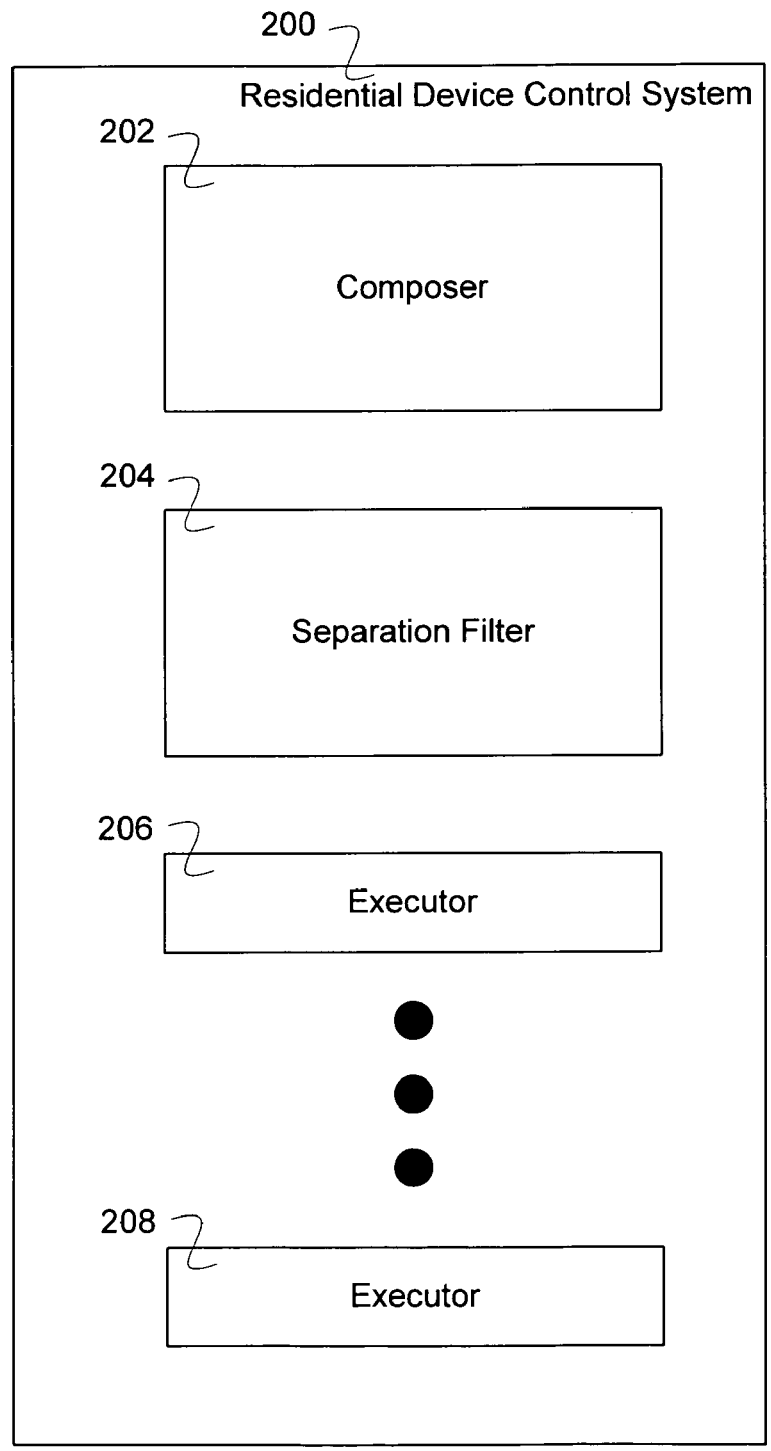
FIG. 2 is a block diagram illustrating an embodiment of a system for distributed execution of residential device control.

FIG. 2 is a block diagram illustrating an embodiment of a system for distributed execution of residential device control. In the example shown, residential device control system 200 includes composer 202, separation filter 204, and a plurality of executors, represented in FIG. 2 by executor 206 and 208. Composer 202 is used to compose a control system state for the residential device control system. A control system state comprise one or more residential devices and their device state—for example, a light and its dimmer switch setting level (e.g., 70% on), a screen and whether it is up or down, a window blind and whether it is open, partially open, or closed, television and whether it is on or off. In various embodiments, the control system state can be composed using a graphical user interface, a list, a set of computer program instructions, by manually setting the devices and recording their states, or any other appropriate manner of indicating a control system state. In various embodiments, the control system state is input using a personal computer, a dedicated control unit device, a personal data assistant, or any other appropriate device or controller. Composer 202 takes the input control system state (e.g., as input by a user or downloaded from a device) and translates it to a set of instructions for the devices in the system.

Separation filter 204 filters the set of instructions to indicate which device a subset of the instructions is for. The filtering indicates which instructions are appropriate for a given device, and the device will, when requested or indicated, execute the appropriate subset of instructions to respond to the request or indication. In some embodiments, the filtering separates the device instructions so that only the appropriate subset of instructions are sent, distributed, or transferred to a given device. In some embodiments, there are a plurality of separation filters located with the plurality of executors (e.g., executor 206 and 208), and each executor (e.g., corresponding to a device) receives instructions for itself and other devices in the system, but filters the instructions so that only the appropriate subset instructions for the device are executed. In some embodiments, the instructions are filtered so that if subsets of the devices are not able to communicate with each other that the devices within each subset can function without any communications with devices in the other subsets.

Executors 206 and 208 execute the filtered instructions for a device to achieve the appropriate control system state indicated or requested. In various embodiments, there is an executor for each device, or there is an executor for multiple devices.

Figure 3:
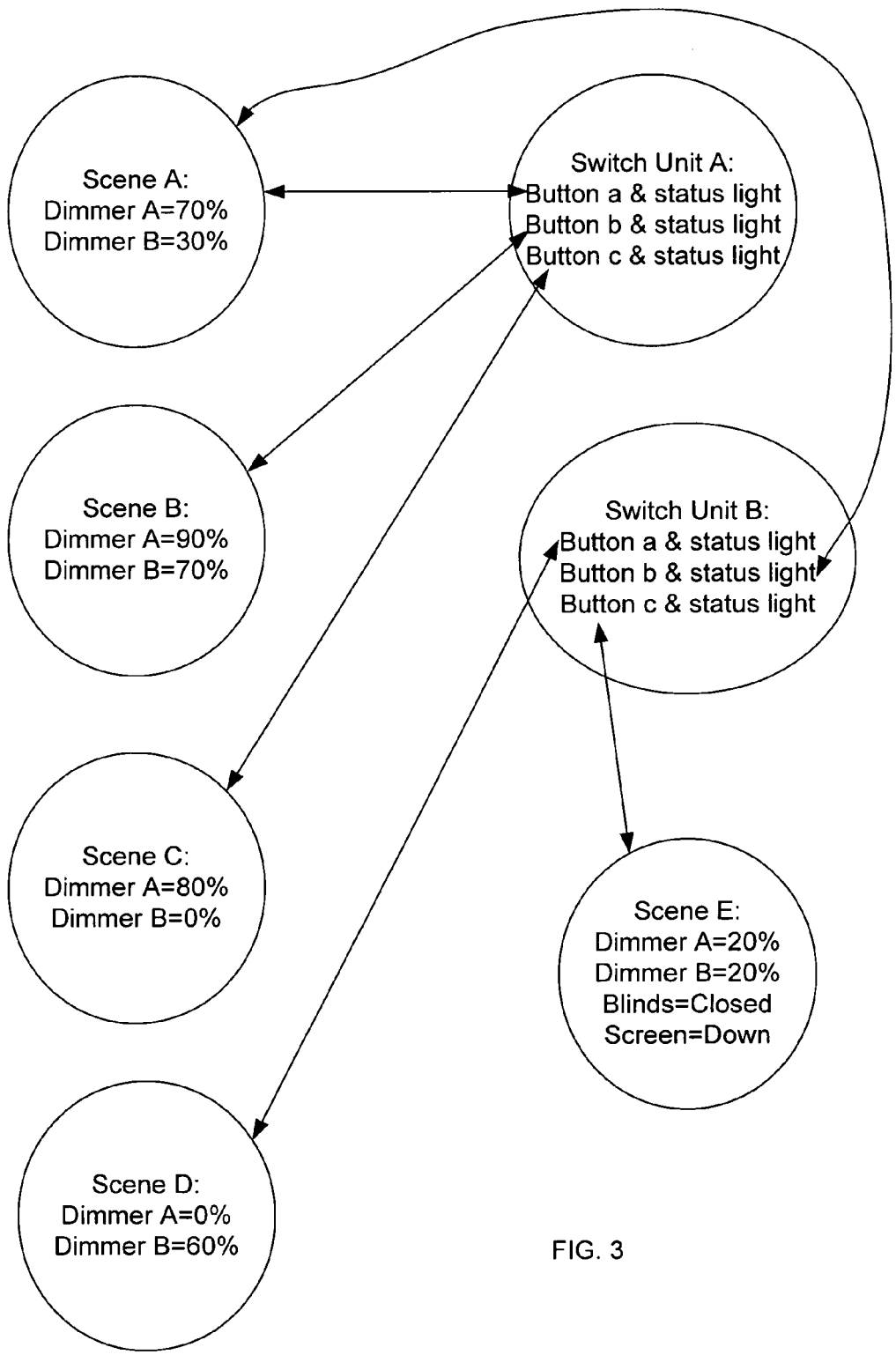
FIG. 3 is a block diagram illustrating a control system state in one embodiment.

FIG. 3 is a block diagram illustrating a control system state in one embodiment. In the example shown, scene A is associated with button a & status light of switch unit A (e.g., 106, 112, and 104 of FIG. 1) and button b & status light of switch unit B (e.g., 124, 130, and 120 of FIG. 1). Scene A comprises dimmer A (e.g., 118 in FIG. 1 controlling light 119) being set to 70% and dimmer B (e.g., 134 in FIG. 1 controlling light 136 and 138) being set to 30%. Scene B is associated with button b & status light of switch unit A (e.g., 108, 114, and 104 of FIG. 1). Scene B comprises dimmer A (e.g., 118 in FIG. 1 controlling light 119) being set to 90% and dimmer B (e.g., 134 in FIG. 1 controlling light 136 and 138) being set to 70%. Scene C is associated with button c & status light of switch unit A (e.g., 110, 116, and 104 of FIG. 1). Scene C comprises dimmer A (e.g., 118 in FIG. 1 controlling light 119) being set to 80% and dimmer B (e.g., 134 in FIG. 1 controlling light 136 and 138) being set to 0%. Scene D is associated with button a & status light of switch unit B (e.g., 122, 128, and 120 of FIG. 1). Scene D comprises dimmer A (e.g., 118 in FIG. 1 controlling light 119) being set to 0% and dimmer B (e.g., 134 in FIG. 1 controlling light 136 and 138) being set to 60%. Scene E is associated with button c & status light of switch unit B (e.g., 126, 132, and 120 of FIG. 1). Scene E comprises dimmer A (e.g., 118 in FIG. 1 controlling light 119) being set to 20%, dimmer B (e.g., 134 in FIG. 1 controlling light 136 and 138) being set to 20%, window blinds (e.g., 140 of FIG. 1) set to closed, and screen (e.g., 144 of FIG. 1) set to down.

Figure 4:
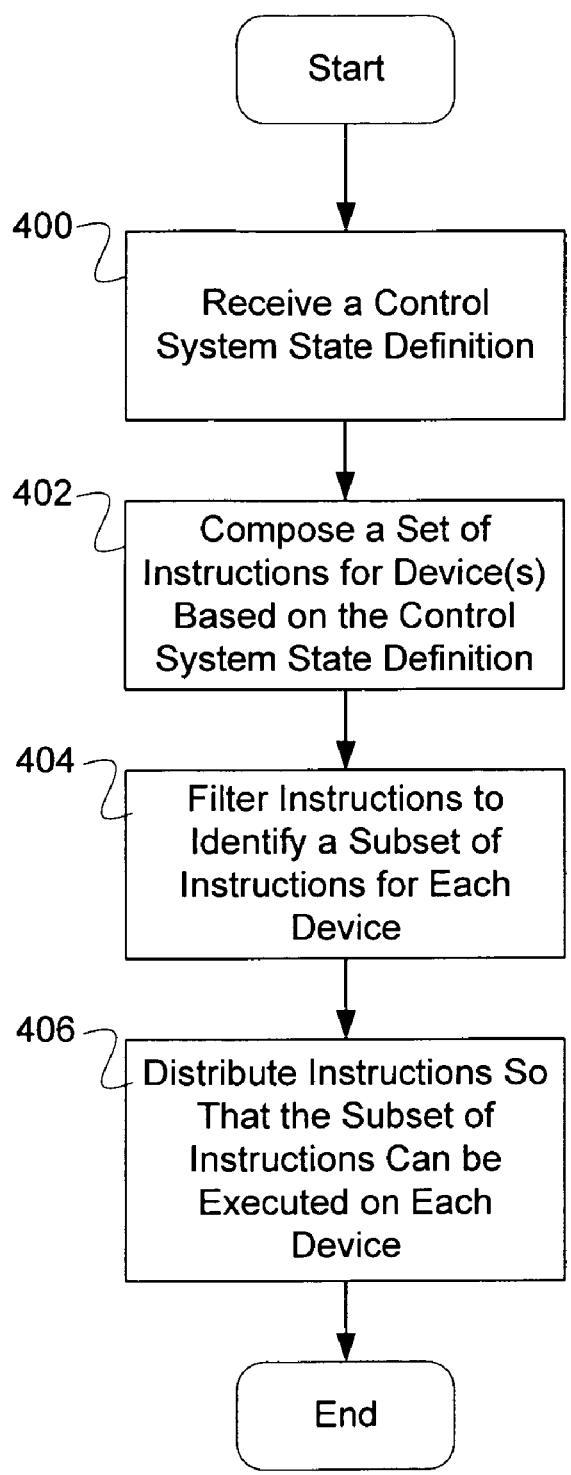
FIG. 4 is a flow diagram illustrating an embodiment of a process for distributed execution of residential device control.

FIG. 4 is a flow diagram illustrating an embodiment of a process for distributed execution of residential device control. In some embodiments, the process of FIG. 4 is executed on residential device control system 200 of FIG. 2. In the example shown, in 400 a control system state definition is received. In 402, a set of instructions is composed for one or more devices based on the control system state definition. In various embodiments, composing instructions comprises: generating a set of computer code instructions, generating a set of assembly code instructions, generating a set of C language instructions, generating a set of JAVA instructions, generating a set of scripts, and/or any other appropriate way to compose instructions. In 404, the set of instructions is filtered to identify a subset of instructions for each device. In 406, the instructions are distributed so that the subset of instructions can be executed on each device. In various embodiments, only the subset of instructions appropriate for each device is distributed to each device, all of the instructions are distributed to each device, or more than the subset, but not all, of the instructions appropriate for each device are distributed to each device.

Figure 5:
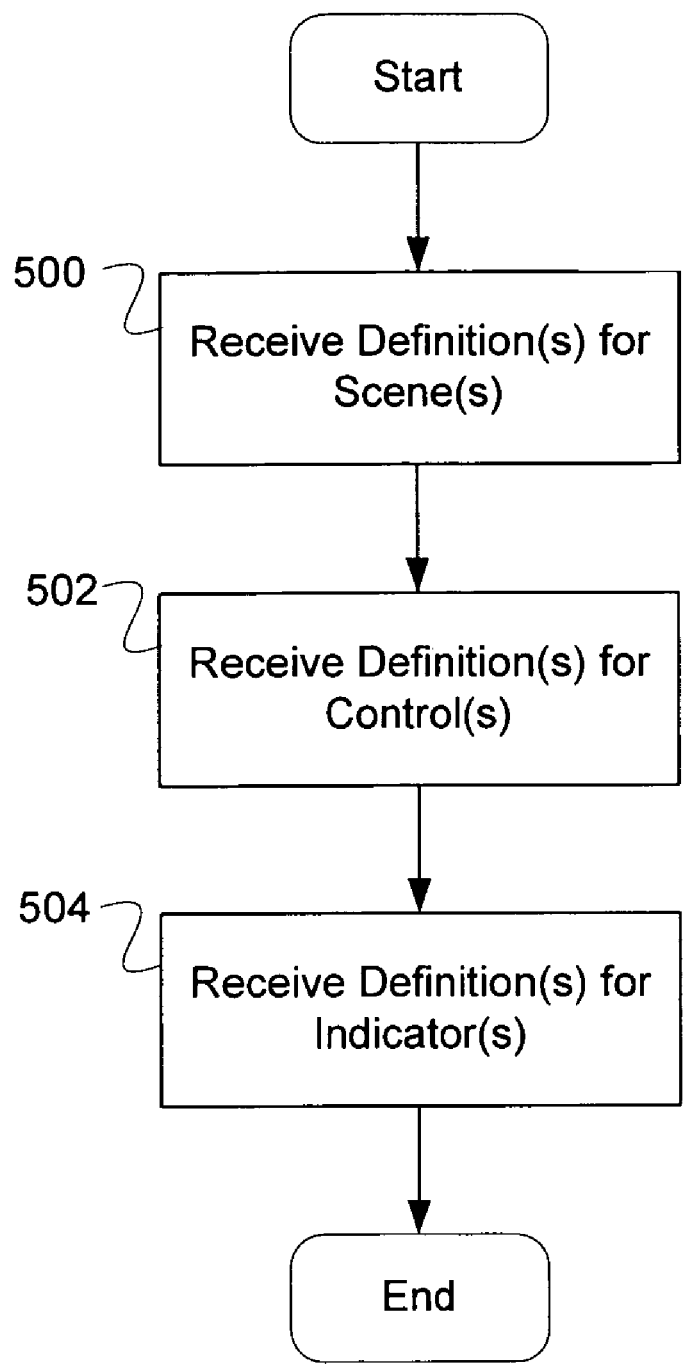
FIG. 5 is a flow diagram illustrating an embodiment of a process for a receiving a control system state definition.

FIG. 5 is a flow diagram illustrating an embodiment of a process for a receiving a control system state definition. A control system state definition can include a residential device identifier, a residential device state, and/or a residential device state duration. In some embodiments, the process of FIG. 5 is used to implement 400 of FIG. 4. In the example shown, in 500 definition(s) for scene(s) are received. A scene can include lighting levels (e.g., light labeled 'A' in state 'ON' for 3 hours), window blind states (e.g., window #4 blinds in state 'closed' for the duration or the scene), screen states, stereo equipment states, video equipment states, and/or temperature levels, etc. In 502, definition(s) for one or more controls are received. A control can be a light switch, a window blind control, a dimmer, a screen control switch, an audio system control switch, a video equipment control switch, and/or a thermostat, etc. In 504, definition(s) for indicator(s) are received. An indicator can be a light on a switch, an icon on a display, a indicator on a screen or graphical user interface of a device, an audio tone, an audio indicator (e.g., a song, a musical phrase, a recognizable noise, etc.), or any other appropriate indicator. In some embodiments, the system state definitions are received using a graphical user interface, using a computer, and/or any other appropriate manner of receiving definitions.

Figure 6:
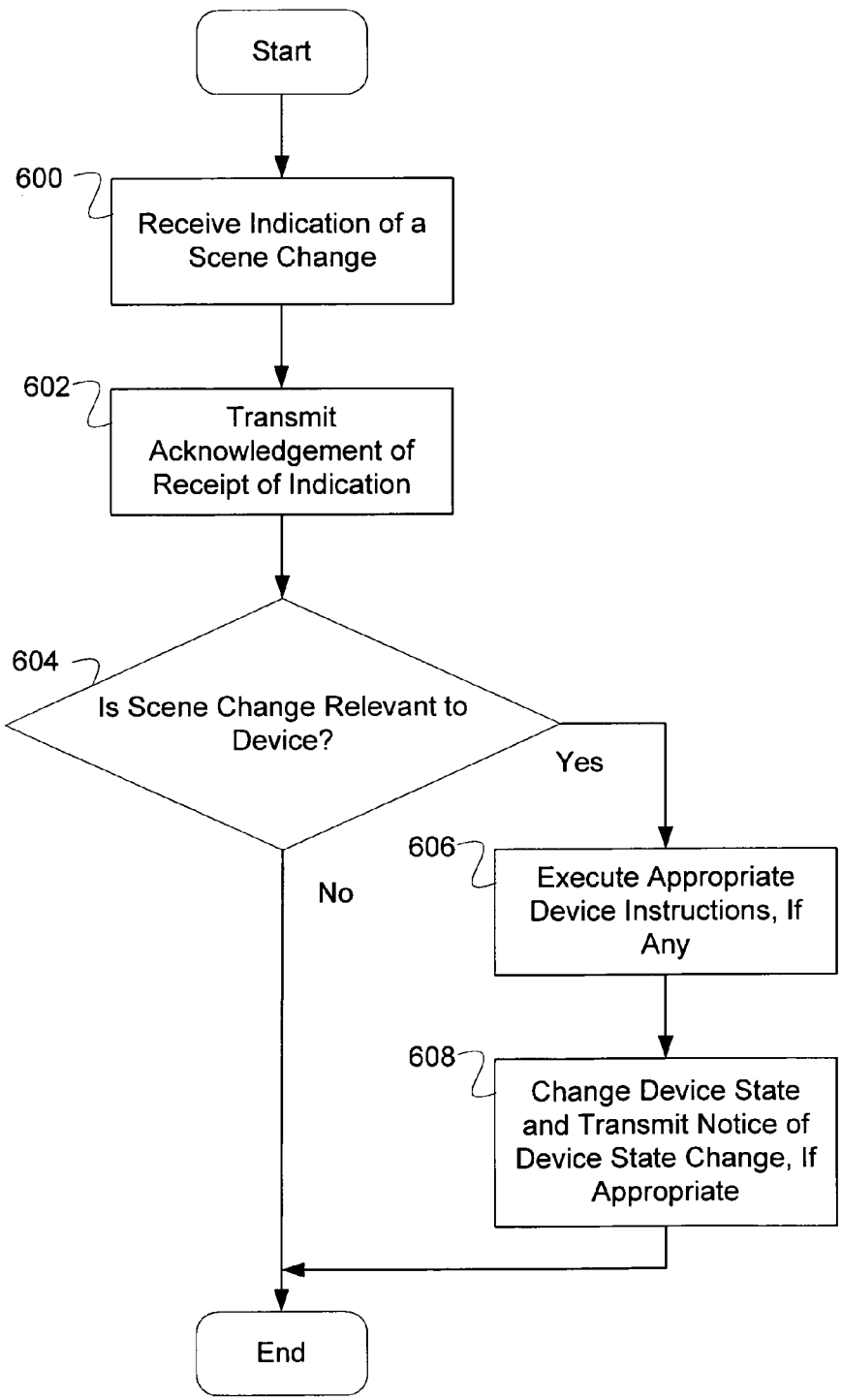
FIG. 6 is a flow diagram illustrating an embodiment of a process for executing distributed instructions on a device.

FIG. 6 is a flow diagram illustrating an embodiment of a process for executing distributed instructions on a device. In some embodiments, the process of FIG. 6 is executed on a device such as switch unit A 104, switch unit B 120, window blinds 140, AV equipment 142, screen motor 144, dimmer A 118, dimmer B 134, or any other appropriate device. In the example shown, in 600 an indication is received of a scene change. In 602, an acknowledgement of receipt of indication is transmitted. In some embodiments, no acknowledgement is transmitted. In 604, it is determined if the scene change is relevant to the device. If it is relevant, then in 606, the appropriate device instructions are executed. In 608, the device state is changed and a notice is transmitted of the device state change, if appropriate, and the process ends. If it is not relevant to the device, then the process ends. In some embodiments, a relevant scene change is for a second device, but it is also relevant to a first device because the first device is monitoring or measuring the second device. In some embodiments, the transmission of the device state change comprises a transmission of a scene change. In some embodiments, devices receive a transmitted notice of a device state change, and this in turn causes the device receiving the notice to change its state and/or execute instructions, if appropriate, and send a notification of a device state change. This can cause a chain of events that are sequenced through the sending of device state changes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for distributed execution of residential device control comprising:
   receiving a system state definition for a plurality of residential devices, wherein the system state definition includes a definition for at least a first scene and a second scene, wherein the first scene at least indicates a first state to be set for a first residential device of the plurality of residential devices and wherein the second scene at least indicates a second state to be set for a second residential device of the plurality of residential devices;
   composing a set of instructions for the plurality of residential devices based at least in part on the system state definition;

for each of the plurality of residential devices:
  filtering the set of instructions to identify a subset of instructions for a residential device; and
  distributing to the residential device at least a portion of the set of instructions;
receiving an indication of a scene change at the residential device, wherein the scene change indicates a change from the first scene to the second scene;
determining at the residential device whether the scene change is relevant to the residential device;
in the event that the scene change is relevant to the device, executing at the residential device instructions of the subset of instructions for the residential device.

2. A method as in claim 1, wherein the system state definition comprises one or more of the following: a residential device identifier, a residential device state, and a residential device state duration.

3. A method as in claim 1, wherein the residential device comprises one of the following: a computer, a lighting unit, a dimmer unit, a light control unit, a window blind unit, a home theater screen unit, a home theater equipment unit, a stereo unit, a television unit, a projector unit, a speaker unit, a volume control unit, a heating unit, an air conditioning unit, a thermostat unit, a buddy device, a state indication unit, electrical measurement unit, or an electrical receptacle unit.

4. A method as in claim 1, wherein the residential device includes a manual mode that can control the residential device overriding a current system state.

5. A method as in claim 1, wherein composing a set of instructions comprises one or more of the following: generating a set of computer code instructions, generating a set of assembly code instructions, generating a set of C language instructions, generating a set of JAVA instructions, and generating a set of scripts.

6. A method as in claim 1, wherein the system state definition is received using a graphical user interface.

7. A method as in claim 1, wherein composing a set of instructions is performed using a computer.

8. A method as in claim 1, wherein the identified subset of instructions for the residential device includes instructions to monitor notifications transmitted to and from a second residential device.

9. A method as in claim 1, wherein the identified subset of instructions for the residential device includes instructions to record notifications transmitted to and from a second residential device.

10. A method as in claim 1, wherein the identified subset of instructions for the residential device includes instructions to transmit a notification in the event that a second residential device is not responding to a notification.

11. A method as in claim 1, wherein the identified subset of instructions for the residential device includes instructions to transmit one or more instructions to a second residential device in the event that the second residential device is not responding to a notification.

12. A method as in claim 1, wherein distributing to the residential device at least a portion of the set of instructions includes distributing to a second residential device for fault tolerance purposes.

13. A method as in claim 1, wherein distributing to the residential device at least a portion of the set of instructions includes distributing the identified subset of instructions for the residential device.

14. A method as in claim 1, wherein distributing to the residential device at least a portion of the set of instructions includes distributing the set of instructions for the plurality of residential devices.

15. A method as in claim 1, wherein the plurality of residential devices is able to communicate using one or more of the following: a local area network, a wired network, a wireless network, and a power line network.

16. A method as in claim 1, wherein filtering to identify a subset of instructions for a residential device is performed before distributing to the residential device.

17. A method as in claim 1, wherein filtering to identify a subset of instructions for a residential device is performed after distributing to the residential device.

18. A method as in claim 1, further comprising testing the system state by setting a residential device in a residential device state as defined by the system state.

19. A method as in claim 1, further comprising simulating the system state by displaying on a graphical user interface a simulation of a residential device in a residential device state as defined by the system state.

20. A method as in claim 1, further comprising measuring the system state.

21. A method as in claim 1, further comprising measuring the system state and creating a report of the system state based on the measurements of the system state.

22. A computer program product for distributed execution of residential device control, the computer program product being embodied in a computer readable storage medium and comprising computer instructions for:
  receiving a system state definition for a plurality of residential devices, wherein the system state definition includes a definition for at least a first scene and a second scene, wherein the first scene at least indicates a first state to be set for a first residential device of the plurality of residential devices and wherein the second scene at least indicates a second state to be set for a second residential device of the plurality of residential devices;
  composing a set of instructions for the plurality of residential devices based at least in part on the system state definition;
  for each of the plurality of residential devices:
    filtering the set of instructions to identify a subset of instructions for a residential device; and
    distributing to the residential device at least a portion of the set of instructions;
  receiving an indication of a scene change at the residential device, wherein the scene change indicates a change from the first scene to the second scene;
  determining at the residential device whether the scene change is relevant to the residential device;
  in the event that the scene change is relevant to the device, executing at the residential device instructions of the subset of instructions for the residential device.

23. A system for distributed execution of residential device control comprising:
  a processor; and
  a memory coupled with the processor, wherein the memory is configured to provide the processor with instructions which when executed cause the processor to:
    receive a system state definition for a plurality of residential devices, wherein the system state definition includes a definition for at least a first scene and a second scene, wherein the first scene at least indicates a first state to be set for a first residential device of the plurality of residential devices and wherein the second scene at least indicates a second state to be set for a second residential device of the plurality of residential devices;

compose a set of instructions for the plurality of residential devices based at least in part on the system state definition;

for each of the plurality of residential devices:
filter the set of instructions to identify a subset of instructions for a residential device; and
distribute to the residential device at least a portion of the set of instructions;

receive an indication of a scene change at the residential device, wherein the scene change indicates a change from the first scene to the second scene;

determine at the residential device whether the scene change is relevant to the residential device;

in the event that the scene change is relevant to the device, executing at the residential device instructions of the subset of instructions for the residential device.

24. A system as in claim 23, wherein the system state definition comprises one or more of the following: a residential device identifier, a residential device state, and a residential device state duration.

25. A system as in claim 23, wherein the residential device comprises one of the following: a computer, a lighting unit, a dimmer unit, a light control unit, a window blind unit, a home theater screen unit, a home theater equipment unit, a stereo unit, a television unit, a projector unit, a speaker unit, a volume control unit, a heating unit, an air conditioning unit, a thermostat unit, a buddy device, a state indication unit, electrical measurement unit, or an electrical receptacle unit.

26. A system as in claim 23, wherein the residential device includes a manual mode that can control the residential device overriding a current system state.

27. A system as in claim 23, wherein composing a set of instructions comprises one or more of the following: generating a set of computer code instructions, generating a set of assembly code instructions, generating a set of C language instructions, generating a set of JAVA instructions, and generating a set of scripts.

28. A system as in claim 23, wherein the system state definition is received using a graphical user interface.

29. A system as in claim 23, wherein composing a set of instructions is performed using a computer.

30. A system as in claim 23, wherein the identified subset of instructions for the residential device includes instructions to monitor notifications transmitted to and from a second residential device.

31. A system as in claim 23, wherein the identified subset of instructions for the residential device includes instructions to record notifications transmitted to and from a second residential device.

32. A system as in claim 23, wherein the identified subset of instructions for the residential device includes instructions to transmit a notification in the event that a second residential device is not responding to a notification.

33. A system as in claim 23, wherein the identified subset of instructions for the residential device includes instructions to transmit one or more instructions to a second residential device in the event that the second residential device is not responding to a notification.

34. A system as in claim 23, wherein distributing to the residential device at least a portion of the set of instructions includes distributing to a second residential device for fault tolerance purposes.

35. A system as in claim 23, wherein distributing to the residential device at least a portion of the set of instructions includes distributing the identified subset of instructions for the residential device.

36. A system as in claim 23, wherein distributing to the residential device at least a portion of the set of instructions includes distributing the set of instructions for the plurality of residential devices.

37. A system as in claim 23, wherein the plurality of residential devices is able to communicate using one or more of the following: a local area network, a wired network, a wireless network, and a power line network.

38. A system as in claim 23, wherein filtering to identify a subset of instructions for a residential device is performed before distributing to the residential device.

39. A system as in claim 23, wherein filtering to identify a subset of instructions for a residential device is performed after distributing to the residential device.

40. A system as in claim 23, wherein the memory is further configured to provide the processor with instructions which when executed cause the processor to: test the system state by setting a residential device in a residential device state as defined by the system state.

41. A system as in claim 23, wherein the memory is further configured to provide the processor with instructions which when executed cause the processor to: simulate the system state by displaying on a graphical user interface a simulation of a residential device in a residential device state as defined by the system state.

42. A system as in claim 23, wherein the memory is further configured to provide the processor with instructions which when executed cause the processor to: measure the system state.

43. A system as in claim 23, wherein the memory is further configured to provide the processor with instructions which when executed cause the processor to: measure the system state and creating a report of the system state based on the measurements of the system state.

44. A device for distributed execution of residential device control comprising:

a plurality of residential devices, wherein each device of the plurality of residential devices comprises:
an executor; and
a memory coupled with the processor, wherein the memory is configured to provide the processor with instructions which when executed cause the memory to load a portion of a set of instructions, which are to be executed by the executor of the device, wherein the portion of the set of instructions is identified and composed based at least in part on a system state definition, wherein the system state definition includes a definition for at least a first scene and a second scene, wherein the first scene at least indicates a first state to be set for a first residential device of the plurality of residential devices and wherein the second scene at least indicates a second state to be set for a second residential device of the plurality of residential devices, wherein the executor executes the portion of the set of instructions, in the event that an indication is received of a scene change at the residential device and it is determined that the scene change is relevant to the device, wherein the scene change indicates a change from the first scene to the second scene.

* * * * *